United States Patent Office 2,719,798
Patented Oct. 4, 1955

2,719,798

MOISTURE-RESISTANT REGENERATED CELLULOSE FILM

William M. Wooding, Springdale, and Tzeng Jiueq Suen, New Canaan, Conn., assignors to American Cyanamid Company, New York, N. Y., a corporation of Maine No Drawing. Application February 9, 1954, Serial No. 409,257

2 Claims. (Cl. 117—76)

The present invention relates to anchor-coated, moisture-resistant, non-fibrous, regenerated cellulose film. More particularly, the present invention relates to non-fibrous regenerated cellulose film impregnated with an anionic urea-formaldehyde-aminoalkyl carboxylic acid resin as anchor coating medium, and to such film carrying a subsequently-applied organic water- and moisture-proofing topcoat. The invention includes non-fibrous regenerated cellulose film bearing the anionic anchoring resin with and without the topcoat, and processes for the manufacture thereof.

Non-fibrous regenerated cellulose film is commercially manufactured by extrusion of viscose solution into an aqueous coagulating bath to form a film, clearing and washing the film, passing the film into a plasticizing bath, and drying the plasticized film. Such film is both water-permeable and water-sensitive and cannot be used as wrapping material where moisture resistance is required. Such film is therefore usually provided with an organic moisture-proofing topcoat, usually a lacquer, permitting the product to be used for the packaging of moist substances including foods, or for the packaging of materials which may be subjected to moist conditions.

The organic water-proofing topcoat, if applied directly to untreated regenerated cellulose film, is rapidly sloughed off when in contact with moisture. It is known that this sloughing off can be retarded by first applying a suitable anchoring resin to the regenerated cellulose film, and then applying the topcoat.

Such anchoring resin, in the form supplied, should be freely dispersible in water, so as to avoid the cost and hazard presented by organic solvents. When deposited and cured it should form a highly moisture-resistant, odorless, and water-clear bond between the cellulose film and the subsequently applied topcoat. Moreover, after application to the film the resin should cure to an insoluble condition sufficiently rapidly to minimize delay in the manufacturing process.

The discovery has now been made that anionic urea-formaldehyde-aminoalkyl carboxylic acid resins, in at least partially cured form, act as very satisfactory anchoring media for topcoat materials, and it has further been found that the resins act in this manner when applied and cured at substantially neutral pH values. When a conventional topcoating material is applied to regenerated cellulose film carrying an anchor coating as described. The resulting composite film has a substantial neutral pH and substantially meets the foregoing requirements.

The resin described has numerous advantages. In the first place, it is absorbed and retained by the film at a substantially neutral pH. Then it is cured by a short period of heating, and no acid curing catalyst is necessary. It is known that the strength and durability of non-fibrous regenerated cellulose film are adversely affected by the presence of acidic material. The process of the present invention is therefore capable of yielding a substantially neutral and therefore stronger and more durable film.

The anchoring resin is perfectly water-white in color, when viewed in bulk. The resin thus causes no noticeable alteration in color even to untinted regenerated cellulose film.

A particular advantageous feature is that the anchoring resin bath is not sensitive to the presence of polyvalent anions, such as the anions normally present in water as well as those delivered to the bath by freshly-formed film. As a result, the bath is particularly adaptable for use in the continuous commercial process for the manufacture of cellulosic film.

Moreover, the anchoring resin of the present invention is compatible with the non-ionic water-soluble polyhydric alcohols commonly used for the plasticization of regenerated cellulose, such as glycerol, and may be mixed therewith especially when the solution is predominantly aqueous, that is, when it contains more than 50% of water. Hence the steps of plasticizing the film and impregnating the film with the anchoring resin may be combined, thus eliminating a step which would otherwise be necessary.

Finally, the resin is principally composed of readily available urea and formaldehyde, and only a small amount of the aminoalkyl carboxylic acid is needed.

According to a preferred embodiment of the present invention, sufficient of the urea-formaldehyde-aminoalkyl carboxylic acid resin is added to a conventional aqueous plasticizing bath containing a water-soluble polyhydric alcohol plasticizer to yield a bath containing between 0.05% and 3% by weight of the resin. The pH of the bath is adjusted to about 6.8. Regenerated cellulose film in wet swollen condition is then passed through this bath, whereupon the film is impregnated both with the plasticizing agent and with the resin, the dwell time therein being substantially sufficient to effect saturation usually 3–5 seconds to 5 minutes. When impregnated in this manner followed by removal of excess liquid, the film normally picks up about 200% of its weight of liquid. The film, thus bearing about 0.1% to 6% by weight of the resin, is then passed over drying drums heated to the normal temperature of about 170°–240° F. until dry, usually about ½ to 5 minutes. This heating is sufficient to cure the resin beyond its gel point.

The film thus produced is substantially neutral having a pH of about 6.8. It consists essentially of non-fibrous regenerated cellulose impregnated with a plasticizer and between about 0.1% and 6% of its weight of a urea-formaldehyde-aminoalkyl carboxylic acid resin cured beyond its gel point, depending principally upon the concentration of the resin in the impregnating bath.

An organic moisture-proofing topcoat is then applied, and the film heated to cure the anchoring resin to its final hydrophobic stage, to dry the topcoat, and to bond the topcoat thereto.

The final film thus consists essentially of the foregoing resin-treated film bearing topcoat material on either or both sides.

The pH of the impregnating bath may be 7 or as high as 7.5. Cure of the anchoring resin, however, is favored by acidity, and where a more rapid cure is desired a pH of 6.5–6.8 is more advantageous. This substantially neutral pH is tolerated well by regenerated cellulose film causing only negligible loss of strength.

The foregoing procedure may be extensively varied, and such variations are within the scope of the present invention.

For example, the resin may be cured to its completely hydrophobic stage on the drying drums, and the topcoat then applied.

Moreover, the regenerated cellulose film bearing the anchoring resin in gelled but not completely hydrophobic condition may be rolled and stored. The anchoring resin even in incompletely cured conditions acts as an antiblocking agent, permitting the regenerated cellulosic film to be freely unrolled at a later date and the topcoat then applied. The resin cures at room temperature (70°–80° F.), and after 4–6 weeks of storage is cured to a hydrophobic condition.

Further, the anchoring resin need not be applied by passing the film into a bath containing the resin. The resin may be applied by spraying an aqueous solution of the resin at a pH of about 6.5–7.5 upon one or both sides of regenerated cellulose film, and excess liquid removed by draining and squeezing. The bath may contain the plasticizer or the film may subsequently be impregnated therewith. The topcoat is applied after the film has been heated and dried as described, the resin being cured at least beyond its gel point.

Still further, cleared, washed regenerated cellulose film, after passage through a bath of the anchoring resin as described, may be passed through a water bath or through a water spray for the purpose of washing excess resin dispersion therefrom, and then passed through a plasticizing bath.

A perceptible improvement in the anchoring of the topcoat is noted when the dry film contains as little as 0.05% by weight of the anchoring resin, so that there appears to be no minimum amount of anchoring resin which will not produce some benefit. Commercially acceptable anchoring results when the film contains 0.2% of the resin. This rapid improvement continues in the case of films containing larger amounts of anchoring resin. The rate of improvement becomes noticeably slower when about 2% of resin is present in the film, and this amount is therefore regarded as the upper limit of the economic range. However, improvement continues to be appreciable in the case of films containing 3% and more of the resin.

Cure of the resin for purposes of the present invention appears to proceed in two stages. The first stage is reached when the resin has passed beyond the gel stage. This stage may best be found by making a series of comparative tests. One sheet of dry plasticized regenerated cellulose film bearing the anchoring resin is topcoated, heated for 10 minutes at 200° F. and tested in water at 185° F. to determine its resistance to sloughing. Another sheet of the same cellulose film is heated for 10 minutes at 200° F., the topcoat then applied and, after drying the topcoat, at the same temperature, the sheet is tested for sloughing in the same manner. Failure of the first sheet to exhibit comparable resistance to sloughing as the second demonstrates that the anchoring resin had been insufficiently cured at the time of application of the topcoat to the first film.

In the second stage, the resin is fully hydrophobic and is resistant to leaching by water and does not dissolve therein. The topcoat may be applied when the resin is in either of the two stages of cure. Maximum anchoring effect in the presence of moisture, however, takes place when the resin is in its full state of cure and therefore if the topcoating has been applied when the resin has passed only slightly beyond the gel stage, the topcoated sheet should be heated to cause the resin to cure completely, or the sheets should be stored at room temperature for several weeks before the regenerated cellulose film is used.

The resin of the present invention is a complex polymer, and is therefore best described in terms of its composition. It is characterized by its content of 1.8 to 3.5 mols of combined formaldehyde and 0.03 to 0.3 mol of combined aminoalkyl carboxylic acid per mol of urea present; by its easy water-dispersibility; by its failure to hydrophobe when extensively diluted with water; and by the fact that when so diluted it is in colloidal anionic condition.

Synthesis of the resin preferably commences with the alkaline reaction of the urea with the formaldehyde to form dimethylolurea or a mixture of methylol and dimethylolurea.

The aminoalkyl carboxylic acid is then added and the reaction continued under acidic conditions until the polymer molecules have grown to colloidal dimensions but are short of the point at which gel formation occurs. Preferably, the reaction is stopped when the resin, at 45% solids and at a temperature of 25° C., has a viscosity of 50 centipoises.

The resins are stabilized by cooling and adjusting their pH to alkalinity. In this form, they remain stable for many months. They are infinitely dispersible in water and may be used without further treatment.

If desired, the aminoalkyl carboxylic acid may be added along with the urea at the outset, and a similar resin is obtained.

The amount of aminoalkyl carboxylic acid added should be sufficient to supply at least 0.03 mol of the material per mol of urea. Less than this results in the development of a resin of inferior characteristics, either because of insufficient stability, low polymerization or inferior anchoring results. Up to about 0.3 mol may advantageously be used, a large proportion being unnecessary to the attainment of satisfactory results. As a practical matter it is preferred to employ from 0.05 to 0.1 mol of the carboxylic acid per mol of the urea, this amount affording very satisfactory results while minimizing consumption of the normally more costly component.

Any lower aminoalkyl carboxylic acid may be used in the manufacture of the resins referred to, that is, acids containing not more than 6 carbon atoms, the longer chain acids being unduly difficult to cure. These include glycine, $\alpha$ and $\beta$-alanine, valine, and leucine. Of these $\beta$-alanine is preferred since this material is readily available and gives very satisfactory results. Moreover, no reason is known why corresponding dicarboxylic acids including aspartic acid and glutamic acid should not prove advantageous, and these are, therefore, included within the scope of the present invention.

Attainment of the colloidal state by the resin molecules during their synthesis may be determined by any customary method, for example, by forming a very dilute solution of the resin and viewing it by transmitted light. Development of an opalescent or faint blue haze indicates the presence of resin molecules of colloidal size. However, formation of colloidal matter takes place well in advance of the point indicated by this test. Moreover, colloidal particles so large that they do not exhibit a bluish haze are also useful in the present invention; such particles, however, exhibit Brownian movement.

The process of this invention can be extended so as to include the treatment of a variety of non-fibrous cellulosic films. It may be applied to films of regenerated cellulose prepared from solutions of cellulose xanthates, cuproammonium cellulose, cellulose nitrate, cellulose acetate, cellulose acetobutyrate, and the like.

Amongst those water-repellent topcoats which may be used in the final treatment of the cellulosic films after they have been subjected to treatment in the resin bonding bath, are those coating compositions containing as the film-forming constituent, compounds such as nitrocellulose, cellulose acetate, methyl cellulose, deacetylated chitin, rubber, chlorinated rubber, rubber hydrochloride, ethyl cellulose, butyl metacrylate, moisture-resistant lacquers, waxes such as montan wax, beeswax, carnauba wax, and other conventional film-forming water-proofing materials.

It will be understood that the topcoat is not necessarily a continuous film. It may consist of printed legends, revenue stamps, or decorative matter.

The invention has been set forth above. It will be illustrated by the following examples. These examples represent only specific embodiments of the invention and are not to be construed in limitation thereof. Parts are by weight unless otherwise stated.

*Example 1*

120 g. of urea (2 mols) were mixed with 341 g. (4.2 mols) of 37% aqueous formaldehyde in a flask equipped with stirrer, thermometer and reflux condenser, and the pH of the mixture adjusted to 9.6 by addition of 10% aqueous sodium hydroxide. The mixture was heated at 71°–74° C. for 20 minutes, at which point 11.6 g. (0.13 mol) of β-alanine was added, decreasing the pH to 4.9. The mixture was refluxed at about 99° C. for 40 minutes at the end of which time the pH of the mixture was 3.6. The reaction temperature was then reduced to 49°–54° C. which was maintained for 75 minutes. The reaction mixture was then cooled to room temperature and neutralized by addition of 20% aqueous sodium hydroxide. The product was a water-soluble resin which had a Gardner-Holdt viscosity of M at 45% resin content and 25° C. When diluted to 0.5% solids with water the resin exhibited a faint bluish haze demonstrating that the resin molecules were of colloidal dimensions.

*Example 2*

The resin of Example 1 was tested as follows:

Wet swollen, non-fibrous regenerated cellulose films were soaked in water until all solubles had dissolved.

An anchor resin-plasticizing bath solution was prepared by forming an 8% solution of glycerol in deionized water, and adding 1% of the resin of Example 1 (resin solids based on the weight of water plus glycerol). The pH of the bath as formed was 6.8.

Samples of the wet swollen films were immersed in the anchoring-plasticizing solution for 5 minutes, drained for 5 minutes, and dried for 10 minutes at 200° F. on a chrome-plated sheet provided with a clamping frame. The dried, anchor-coated films were flexible and perfectly transparent and colorless.

Control cellulose films were prepared in the same manner by the use of an 8% glycerol-water plasticizing solution at pH 6.8 to which no resin had been added.

When dry, all films were immersed in a standard nitrocellulose topcoat lacquer solution prepared as described in U. S. Patent No. 2,394,009, drained, air-dried for one hour, and divided into three sets composed of control films and anchor coated films, which sets were respectively cured at 210° F. for 3, 8, and 13 minutes. The resulting films were also colorless and odorless.

Strips were cut from all the films, all the edges of the strips being freshly cut, and the strips were subjected to the standard accelerated slough test, control strips being tested simultaneously in each instance with treated strips. The strips were tested every few minutes by rubbing with moderate pressure between two fingers. Failure being taken as occurring when the top-coating began to slough and the fail times averaged, results are as follows:

| Sample | Minutes to Slough After Curing [1] | | |
|---|---|---|---|
| | 3 Min. | 8 Min. | 13 Min. |
| Control | 1 | 1.5 | 1.5 |
| Anchor-Coated | 4.5 | 7 | 9.5 |

[1] At 210° F.

Ordinarily in such a test incipient sloughing is denoted by separation of the topcoat at a freshly cut edge of the film. No such separation was observed in these tests except in the case of control films.

We claim:

1. A substantially neutral non-fibrous regenerated cellulose film impregnated with a substantially neutral urea-formaldehyde-aminoalkyl carboxylic acid resin cured beyond its gel point and coated with a water-repellent topcoat, said aminoalkyl carboxylic acid containing not more than 6 carbon atoms; said resin containing, per mol of combined urea, from 1.8 to 3.5 mols of combined formaldehyde and from 0.03 to 0.3 mol of combined aminoalkyl carboxylic acid.

2. A non-fibrous regenerated cellulose film impregnated with a substantially neutral urea-formaldehyde-β-alanine resin cured beyond its gel point and coated with a water-repellent topcoat; said resin containing, per mol of combined urea, from 1.8 to 3.5 mols of combined formaldehyde and from 0.03 to 0.3 mol of combined β-alanine.

References Cited in the file of this patent
UNITED STATES PATENTS

| 2,389,415 | D'Alelio | Nov. 20, 1945 |
| 2,646,368 | Wooding et al. | July 21, 1953 |